United States Patent

Winslow et al.

[11] Patent Number: 5,553,389
[45] Date of Patent: Sep. 10, 1996

[54] APPARTUS AND METHOD FOR ADJUSTING VEHICLE TOE ALIGNMENT ANGLES

[75] Inventors: Matthew R. Winslow, Arnold, Md.; Douglas E. Woolverton, Yardley, Pa.; Daniel B. January, St. Peters, Mo.

[73] Assignee: Hunter Engineering Company, Bridgeton, Mo.

[21] Appl. No.: 239,592

[22] Filed: May 5, 1994

[51] Int. Cl.$^6$ .............................. G01B 21/22; G01B 5/24; G01B 7/30; G01B 11/26
[52] U.S. Cl. .................................... 33/203.18; 356/139.09
[58] Field of Search ........................... 356/139.09, 152.1, 356/155; 33/203.15, 203.16, 203.17, 203.18, 203.19, 203.2

[56] References Cited

U.S. PATENT DOCUMENTS

| | | | |
|---|---|---|---|
| 4,095,902 | 6/1978 | Florer et al. | 356/155 |
| 4,319,838 | 3/1982 | Grossman et al. | 356/139.09 |
| 4,523,844 | 6/1985 | Titsworth et al. | 356/139.09 |
| 4,761,749 | 8/1988 | Titsworth et al. | 364/559 |
| 5,388,057 | 2/1995 | January | 364/551.01 |

*Primary Examiner*—Thomas H. Tarcza
*Assistant Examiner*—Pinchus M. Laufer
*Attorney, Agent, or Firm*—Polster, Lieder, Woodruff & Lucchesi

[57] ABSTRACT

Toe of a pair of wheels on the same axle is adjusted by first measuring the toe of a first wheel of the axle. A specification value for the toe of the first wheel is then subtracted from the measured value of toe for that wheel, and the difference is stored as a first toe comparison value. The toe of a second wheel on that axle is adjusted until the total toe of the wheels on that axle minus a specification value for total toe for the wheels on that axle equals the first toe comparison value. The toe of the first wheel is subsequently adjusted until the total toe of the wheels on the axle is substantially equal to the specification value for the total toe for the wheels on that axle. Apparatus which performs the method is also disclosed.

21 Claims, 6 Drawing Sheets

APPARTUS AND METHOD FOR ADJUSTING VEHICLE TOE ALIGNMENT ANGLES

BACKGROUND OF THE INVENTION

This invention relates to vehicle wheel alignment systems, and in particular to method and apparatus for adjusting toe.

Proper alignment of wheels in a vehicle is important for proper handling of the vehicle and proper tire wear. The alignment of a vehicle's wheels is performed primarily by adjusting camber, caster, steering axis inclination (SAI) and toe. Of paramount importance to the driver of the vehicle is that the vehicle drive straight down the mad when the steering wheel is held in its straight or rest position. This condition is a function of toe of the vehicle, and in particular is affected by the relative toe of one wheel on the steering axle with respect to the other.

Heretofore, the method of adjusting toe on a vehicle was relatively complicated. The toe of each wheel on the steering axle is conventionally compared to a toe specification value for that wheel and vehicle, and the total toe is also compared with a total toe specification value for the vehicle. This procedure frequently required repeated attempts to get the individual toe values and the total toe to fall within specification. The prior art method also required locking the steering wheel in the straight ahead position, since any change in the steering wheel position would adversely affect the measurement of the individual toe values.

Even with all this work on the part of the technician/user, correcting the toe of the wheels to specification did not always result in the vehicle driving straight ahead when the steering wheel was held in the straight ahead position. The tolerances on these specifications are such that adjusting each wheel to within the tolerance of the specification can result in substantial unbalanced side forces being applied by the wheels.

SUMMARY OF THE INVENTION

Among the various objects and features of the present invention may be noted the provision of an improved apparatus and method for adjusting vehicle toe.

A second object is to provide such a method and apparatus which simplifies the adjustment of total toe and individual toe.

A third object is the provision of such a method and apparatus which eliminates the need to repetitively adjust the individual toes of wheels on a single axle.

A fourth object is the provision of such a method and apparatus which ensures that the toe is adjusted such that when the steering wheel is pointed in the straight ahead direction, the vehicle tracks straight ahead.

A fifth object is the provision of such a method and apparatus which obviates the need to lock the steering wheel in position during the adjustment of toe.

A sixth object is the provision of such a method and apparatus which guides the technician/user through the toe adjustment process.

A seventh object is the provision of such a method and apparatus which includes a visual display of direction and magnitude of required toe adjustments.

An eighth object is the provision of a novel method of adjusting toe and an apparatus for guiding the user through the novel method.

Other objects and features will be in part apparent and in part pointed hereinafter.

Briefly, in a first aspect of the present invention a method of adjusting toe of a pair of wheels on the same axle includes the steps of measuring the toe of a first wheel on a first axle of a vehicle, subtracting a specification value for the toe of the first wheel from the measured value of toe for the first wheel, and storing the result as a first toe comparison value. The toe of a second wheel on the axle of the vehicle is adjusted until the total toe of the first and second wheels on the axle minus a specification value for total toe for the wheels on the axle equals the first toe comparison value. The total toe minus the total toe specification value is adjusted total toe. The toe of the first wheel is subsequently adjusted until the adjusted total toe is substantially zero.

In a second asset of the present invention a vehicle wheel alignment apparatus is provided for guiding the adjustment of toe of a pair of wheels on the same axle of a vehicle. The apparatus includes first sensor apparatus for measuring the toe of a first wheel on a first axle of a vehicle, second sensor apparatus for measuring the toe of a second wheel on the axle, and a circuit element for storing a specification value for the toe of the first wheel. A controller is responsive to the sensor apparatus and to the storing element for subtracting the specification value from the measured value of toe for the first wheel and for storing the result in the storing element as a first toe comparison value. The storing element has stored therein a specification value for total toe for the axle, the total toe being the sum of the toe for the first and second wheels. The controller is responsive to the sensor apparatus for the first wheel and to the sensor apparatus for the second wheel to compute total toe and to update the computation of total toe as additional measurements of the toe of the first wheel and the second wheel are made by the sensor apparatus. The controller is further responsive to the stored specification of total toe to compute the difference between measured total toe and the total toe specification, the difference being updated by the determining means as additional toe measurements are made by the sensor apparatus. A display is provided which is responsive to the controller for visually guiding the adjustment of the toe of the second wheel to a point where the total toe of the first and second wheels minus the total toe specification value equals the first toe comparison value. The total toe minus the total toe specification value is adjusted total toe. The controller is responsive to the adjusted total toe falling within a predetermined tolerance of the first toe comparison value for controlling the display to visually guide the adjustment of the toe of the first wheel until the adjusted total toe is substantially zero.

BRIEF DESCRIPTION OF THE DRAWINGS

Similar reference characters indicate similar parts throughout the several views of the drawings.

DESCRIPTION OF THE PREFERRED EMBODIMENTS

Figure 1:
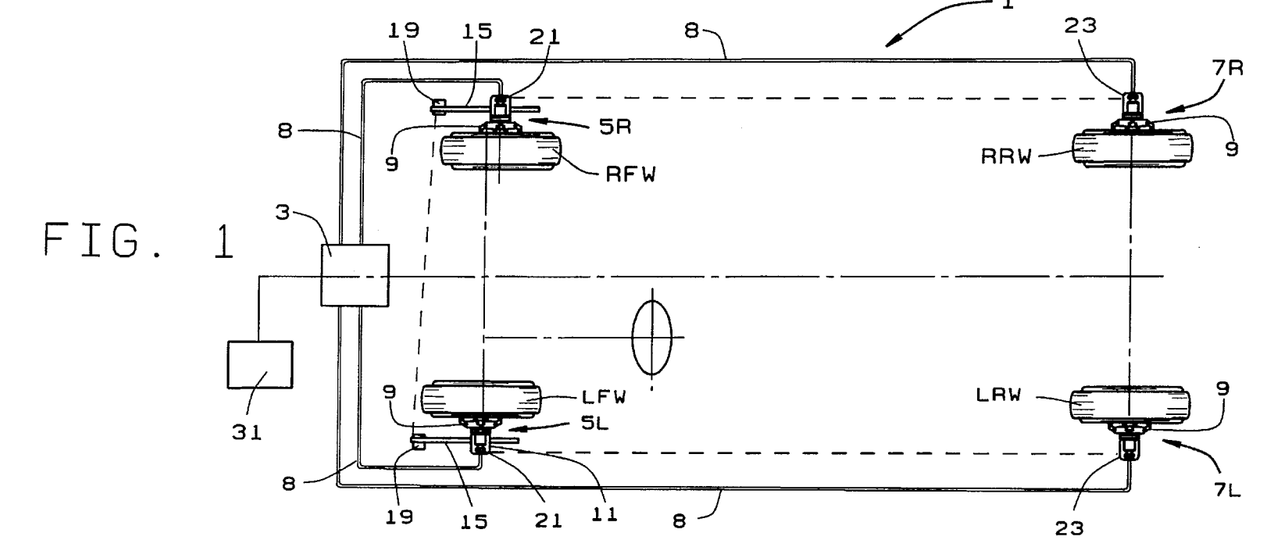
FIG. 1 is a schematic plan view of an alignment apparatus of the present invention applied to a vehicle's wheels.

Turning to FIG. 1, a wheel alignment system 1 of the present invention includes a main console having a microprocessor 3, left and right front head units 5L and 5R, and left and right rear head units 7L and 7R. Head units 5L and 5R mid 7L and 7R each include their own microprocessors 2 (see FIG. 3) which are connected to microprocessor 3 by cables 8 or any other suitable communication channel such as radio or infrared. The head units are substantially similar to the head units described in U.S. Pat. No. 4,319,838 to Grossman et al., which is incorporated herein by reference. Although the head units are preferably connected to an external microprocessor 3 or a digital signal processor (DSP), microprocessors 2 (or equivalently DSPs) may be organized in a network without an external microprocessor.

Figure 2:
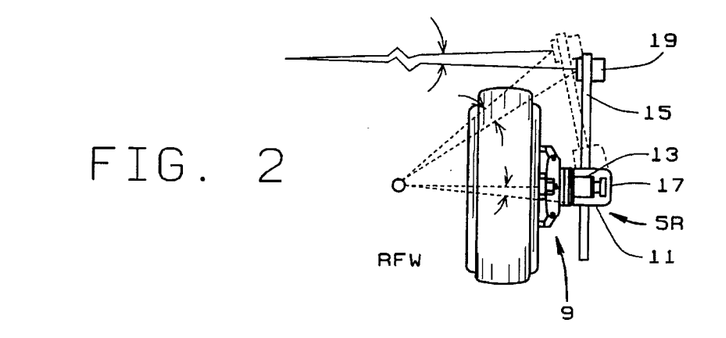
FIG. 2 is an enlarged plan view of a head unit applied to a steerable (front) wheel of the vehicle.

The head units are mounted to the left front wheel LFW, the right front wheel RFW, the left rear wheel LRW, and the right rear wheel RRW of a vehicle to measure the vehicle's alignment parameters. The head units are supported on the wheels by suitable adapters 9. A front head unit is shown in more detail in FIG. 2. Each front head unit includes a housing 11, a sleeve 13 and an arm 15. (The rear head units are substantially similar to the front head units. The only significant difference is that the rear head units lack the arms 15.) Sleeve 13 mounts over a spindle of the corresponding support adapter 9 to support the head unit. The head unit can swing freely about the spindle. The head unit can be positionally fixed by tightening a knob 17. A level mounted on arm 15 indicates when the unit is horizontally level. Once the head unit is leveled, knob 17 is tightened to hold the head unit in its level position.

The front head units each include two sensor units 19 and 21 (see FIG. 1), sensor units 19 being used for the measurement of too. Each rear head unit includes one sensor unit 23. Each sensor unit includes a signal emitter 25 and a receiver 27 (see FIG. 3), each receiver being operatively connected through its sensor unit microprocessor 2 to microprocessor 3 via lines 8. The sensor units operate in pairs, as set forth fully in the above noted U.S. Pat. No. 4,319,838 to determine the alignment angles for the vehicle tested. In particular, the pair of sensor units 19 operate to determine the too angles of their respective wheels, and microprocessor 3 from those toe angles calculates total too.

Figure 3:
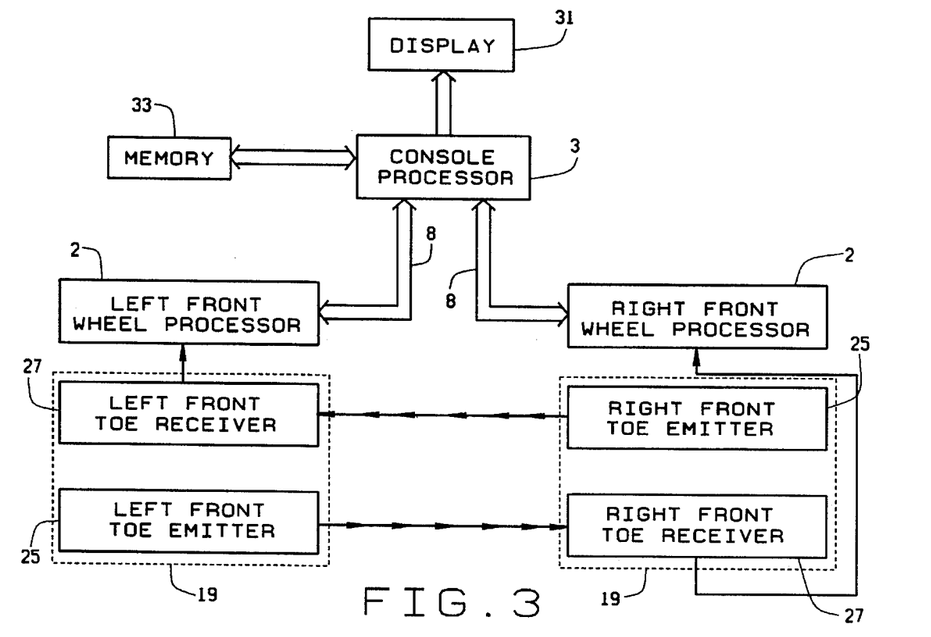
FIG. 3 is a block diagram of the circuitry of the alignment apparatus of FIG. 1.

Also shown in FIG. 3 is a display 31 (preferably a CRT type display conventionally used with microprocessors) for displaying information to the user, and in particular for guiding the technician/user through the too adjustment process. A memory 33 is also provided for storing specification information (such as individual toe specification values and tolerances, as well as total too specification values and tolerances. Although shown as a separate component, memory 33 may be incorporated into console processor 3. Alternatively, the memory may be associated with the individual wheel processors 2, depending upon the overall computer system design.

Figure 4:
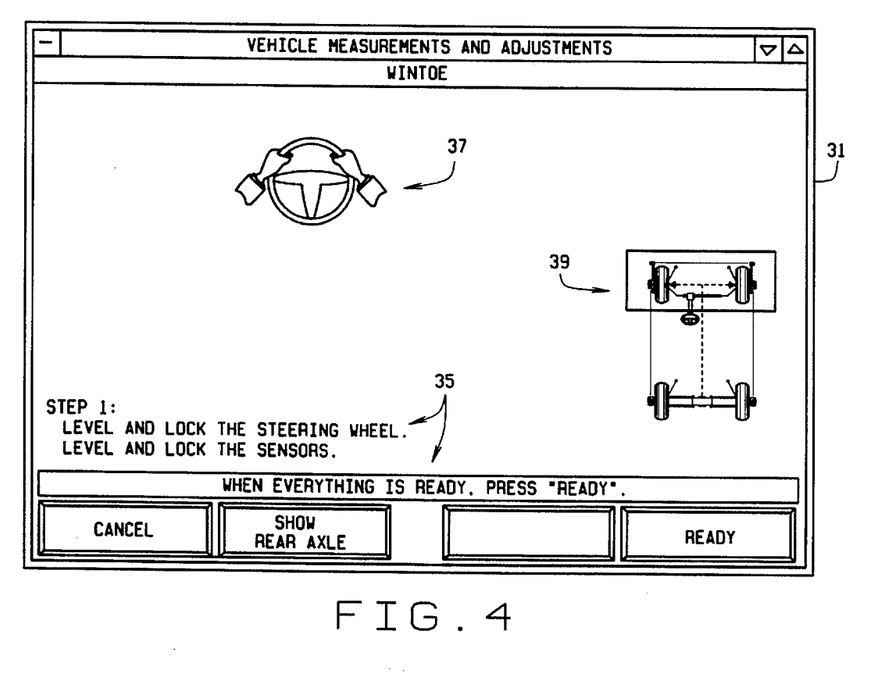
FIGS. 4–12 are representations of display screens used in the present invention to guide the technician/user in adjusting the toe angles of a vehicle.

Display 31 is controlled by console processor 3 to display to the technician/user an initial toe adjustment screen such as is shown in FIG. 4. This screen display includes a set of instructions 35 for the technician/user to begin the too adjustment process of the present invention. The first instruction displayed is "Level and lock the steering wheel." Although this step is not required when using the present process, it does simplify the procedure and reassures the technician/user who is accustomed to locking the steering wheel during toe adjustment procedures. The second instruction is to "Level and lock the sensors." This step is conventional. The screen display also includes a pair of visual indicia in the form of diagrams 37 and 39 which indicate to the user the desired action and the particular wheels which are the subject of the instructions. When the user has performed these actions, he presses the "Ready" key, and the display advances.

Figure 5:
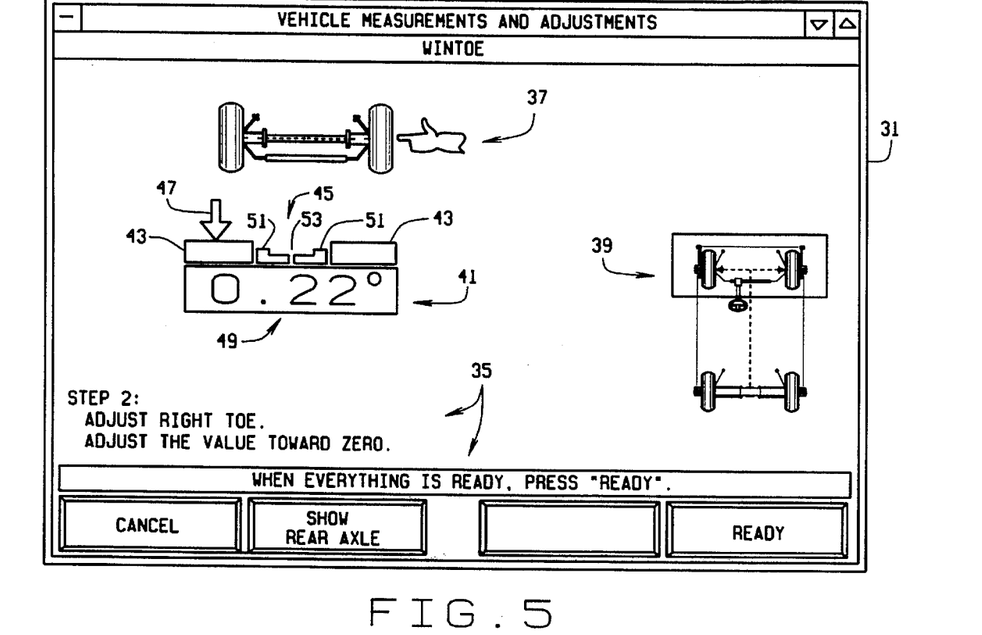

The next visual display, the screen shown in FIG. 5, begins the actual toe adjustment process. This screen includes new instructions 35, which state:

"Adjust right toe. Adjust the value toward zero."

The desired action diagram 37 points to the right wheel in this screen, while the from wheels are still highlighted in diagram 39. A new visual indicia, graphical representation 41, on this screen provides to the technician user a visual indication of the direction and magnitude of the required adjustment to toe of the right front wheel. Specifically, this graph includes a set of bars 43 which represent out of tolerance values, a target area 45 indicating within tolerance values, and an arrow 47 representing the present value. Also shown below these graphical elements is a numeric indication 49 of the magnitude of the desired adjustment.

Target area 45 includes a pair of stepped bars 51 separated by a line 53. The shoulder in stepped bars 51 represents the point at which the measurement changes from being within the tolerance to being within 50% of the tolerance. Line 53 represents the desired value (zero point) for the adjustment.

One aspect that makes this display unique is that the displayed information indicated by arrow 47 and numeric display 49 is not right toe measurement minus right toe specification. Instead, the present invention operates using an entirely different approach. Processor 3 is responsive to the initial toe measurements for the left front wheel LFW from the toe sensors to determine left front toe at the start of the toe adjusting procedure and to subtract the specification value for left front toe from the initial measured left front toe value. The result is stored in memory 33 as a first toe comparison value.

Figure 6:
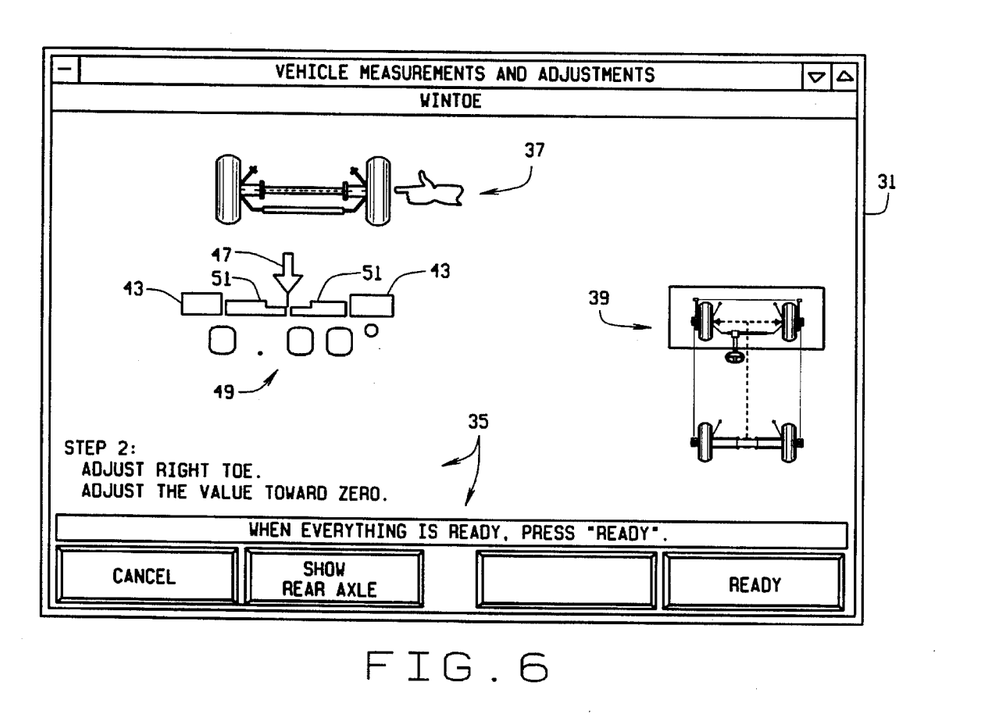

After recording this initial value of left from toe, the processor thereafter deals solely with total toe minus total toe specification. The aim of this step of the method (which is represented by the target line 53 in display 41) is to adjust the toe of the right wheel until the total toe equals the first comparison value, which may be represented in equation form as follows:

$$TT-TT(\text{spec.})=LFT-LFT(\text{spec.}),$$

where TT equals measured total toe, TT(spec.) equals the specification value for total toe, LFT is the initially measured value of left front toe, and LFT(spec.) is the left front toe specification value. As the measured total toe (minus total toe specification) approaches the first comparison value, arrow 47 is controlled to approach target line 53. If rite target line is passed, the arrow appears at the appropriate position on the other side of target line 53. In addition, as the target line 53 is approached, the numeric indicia 49 are controlled to represent correspondingly smaller numbers. The situation where the toe of the right front wheel is adjusted until the total toe minus specification equals the first comparison value is illustrated in FIG. 6. When the user has performed these actions, he again presses the "Ready" key, and the display again advances. At this point, all adjustment of the right toe is complete, and adjustment to the toe of the left front wheel is begun.

Figure 7:
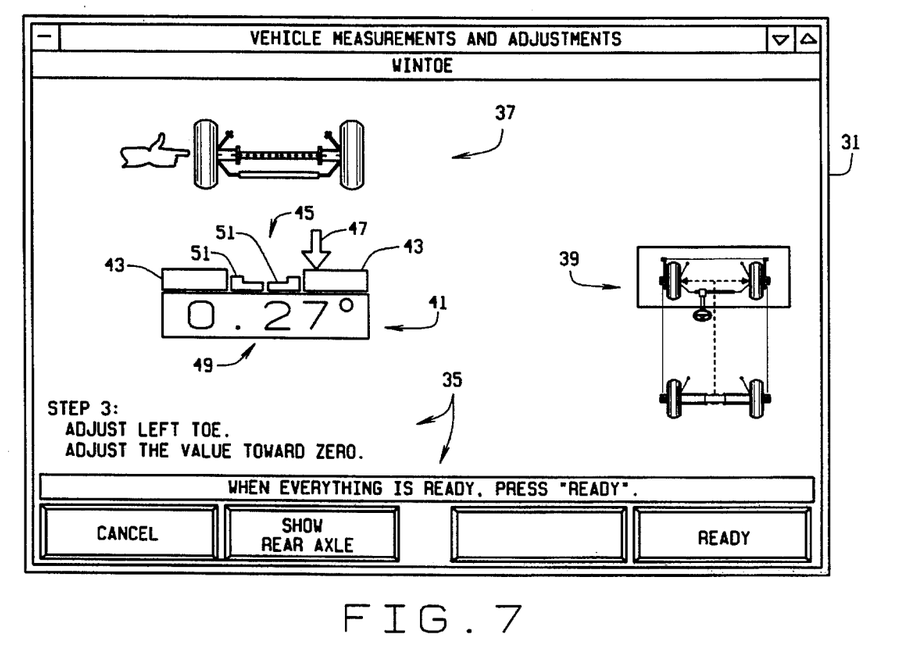
Figure 8:
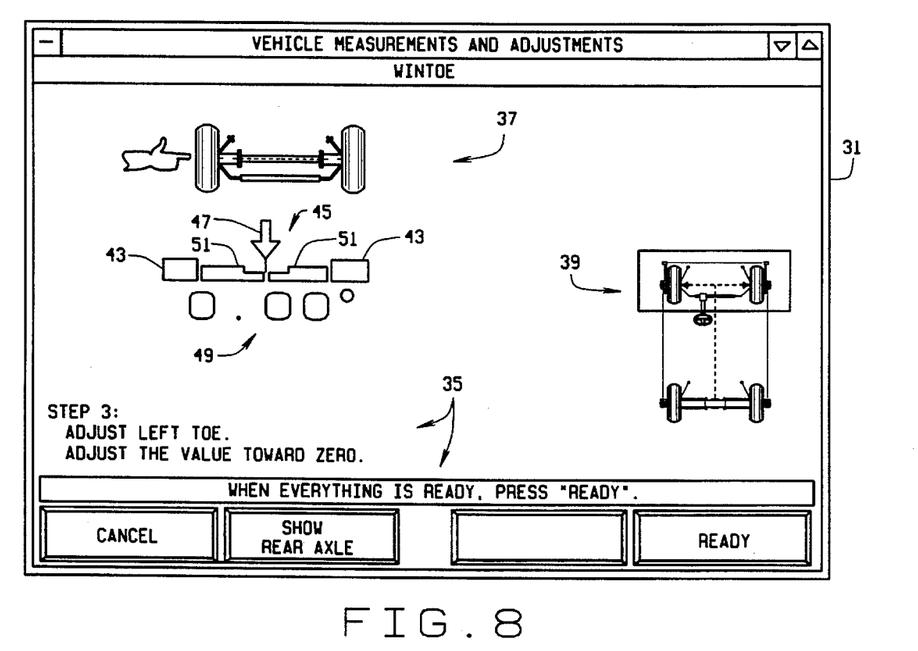

Adjustment of the left front wheel toe is illustrated in FIGS. 7 and 8. At this point in the process, the processor causes the instruction display to read "Adjust left toe. Adjust the value toward zero."

The desired action diagram 37 now has indicia pointing to the left wheel, while diagram 39 continues to indicate that the action is to be performed on the front wheels of the vehicle. The bar graph display 41 is controlled during this step to display to guide the technician/user to adjust the toe of the left wheel so that the difference between total toe and the total toe specification becomes zero. The processor 2 uses the bar graph 41, and particularly the placement of the arrow 47 with respect to the rest of the bar graph to indicate to the user the desired magnitude and direction of the adjustment. The processor in determining this magnitude and direction does not at this point in the process compare measured left toe with left toe specification, but rather compares total toe with total toe specification. Since the right toe, has already been adjusted using a similar scheme, adjustment of total toe (minus specification) at this point in the procedure results in left toe being adjusted to the desired value.

Note that the tolerance bars 51 shown in FIG. 6 are larger than those shown in FIG. 5. Processor 3 controls file size of the bars such that as the tolerance is approached, the bars become larger. This provides a larger target 45 for the technician/user and improves the precision of the adjustment. In this connection note that in FIG. 8 (as in FIG. 6), the tolerance bars 51 are larger still. In addition, processor 3 causes the display of different sized tolerance bars for difference tolerances—the tolerance bars for a larger tolerance being larger than those for a smaller tolerance.

Processor 3 controls the display of screens such as those described above to prevent the technician/user from going on to the next step in the procedure until the previous step is satisfactorily completed. That is, the processor will not continue to subsequent screens until the adjustment of the current screen is performed to within the tolerance indicated by the tolerance bars 51. If the adjustment is not made to within tolerance, the next screen showing the magnitude and direction of the required change to toe of the other wheel is not displayed.

Although it is preferred that the technician/user make the adjustment of toe to the exact specification, this does not always occur. In those cases where the adjustment results in the toe being within tolerance, but not to the exact specification value, a problem can arise. This is because the present invention is concerned with total toe, not individual toe, in general. Any deviation or error in the adjustment of the right wheel toe from specification, therefore, effects file total toe used to guide the adjustment of the left wheel toe. Using this total toe value can result in the toe of the left wheel also varying from specification by a similar amount. When this occurs the two wheels point in the same direction, but that direction is not straight ahead when the steering wheel is pointed straight ahead. Such a condition is unacceptable. Consequently, microprocessor 3 records any residual error in the adjustment of the right front toe and biases the display used to adjust left toe 41 and 49 such that, if left toe were adjusted exactly "to specification" per the display 41 and 49, it would have the same residual error as right toe. This results in "symmetric toe", such that the two wheels have the same toe angles when the steering wheel is level. Even though right toe is not adjusted perfectly, the adjustment of left toe is not compromised, and the steering wheel is level when the vehicle tracks in a straight line.

Figure 9:
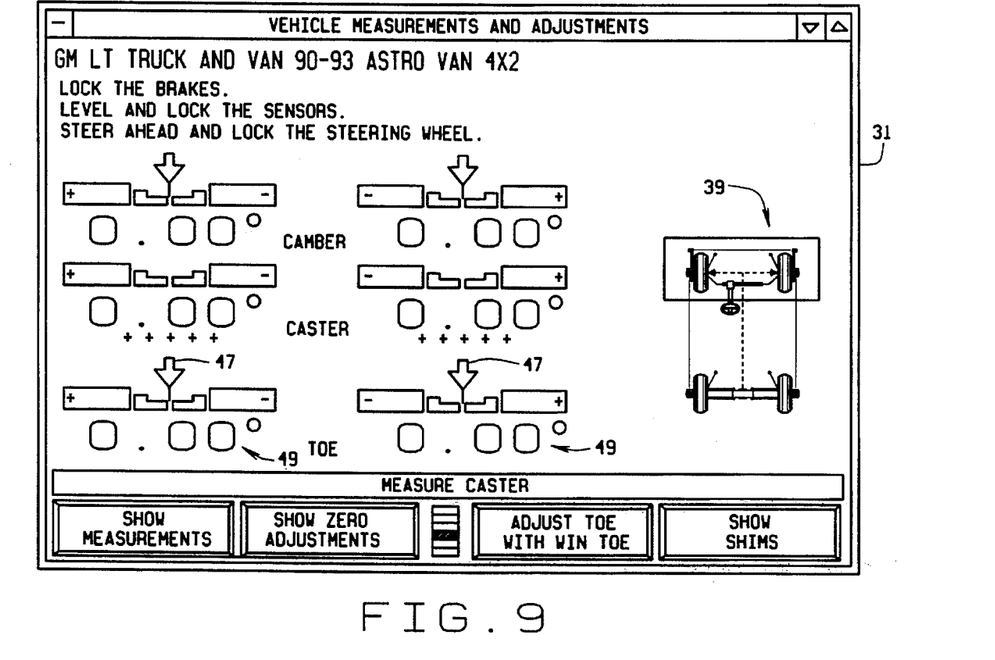

Note that the legend at the bottom of the display of FIG. 8 reads "When Everything is Ready, Press 'Ready'". When this command is followed, a screen such as that of FIG. 9 is displayed, which shows the toe within specifications and instructs the user to perform the next step, in this case "Measure Caster." It should be appreciated that the particular next step is not a part of the present invention.

Figure 10:
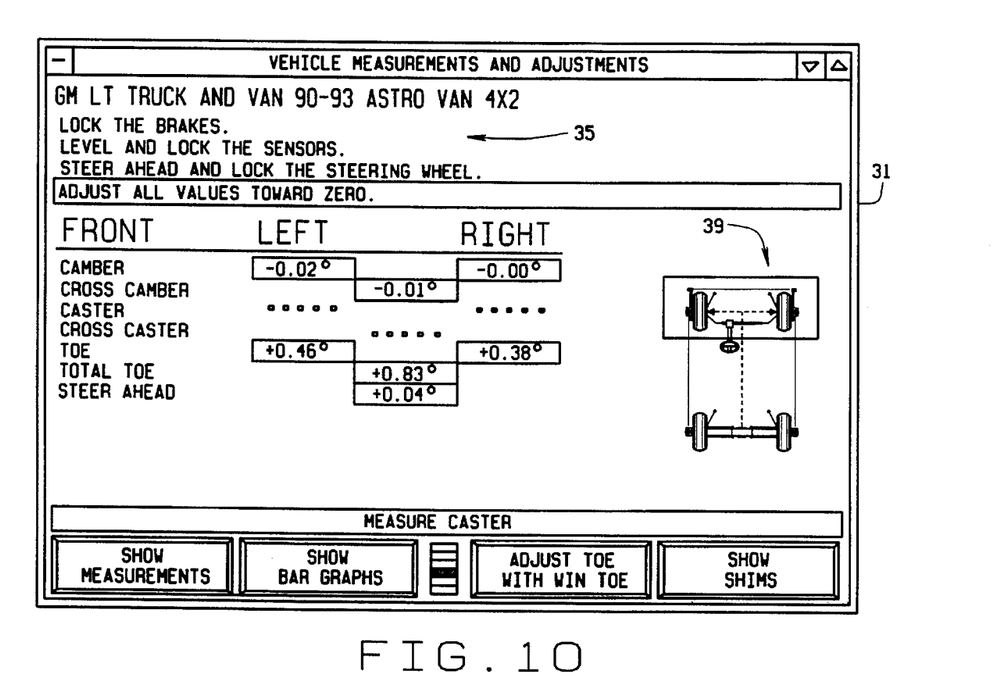
Figure 11:
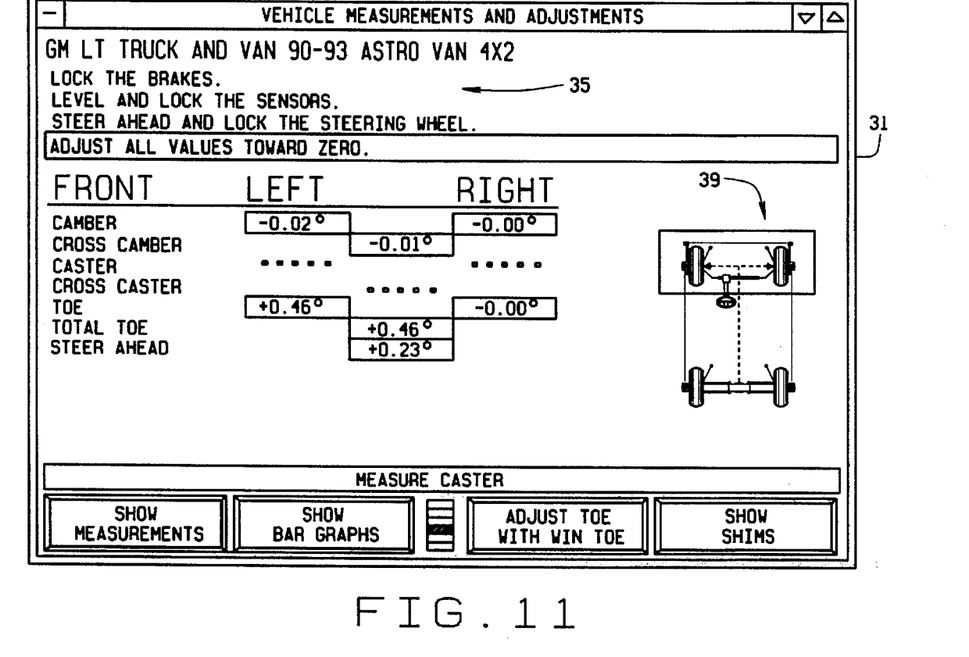
Figure 12:
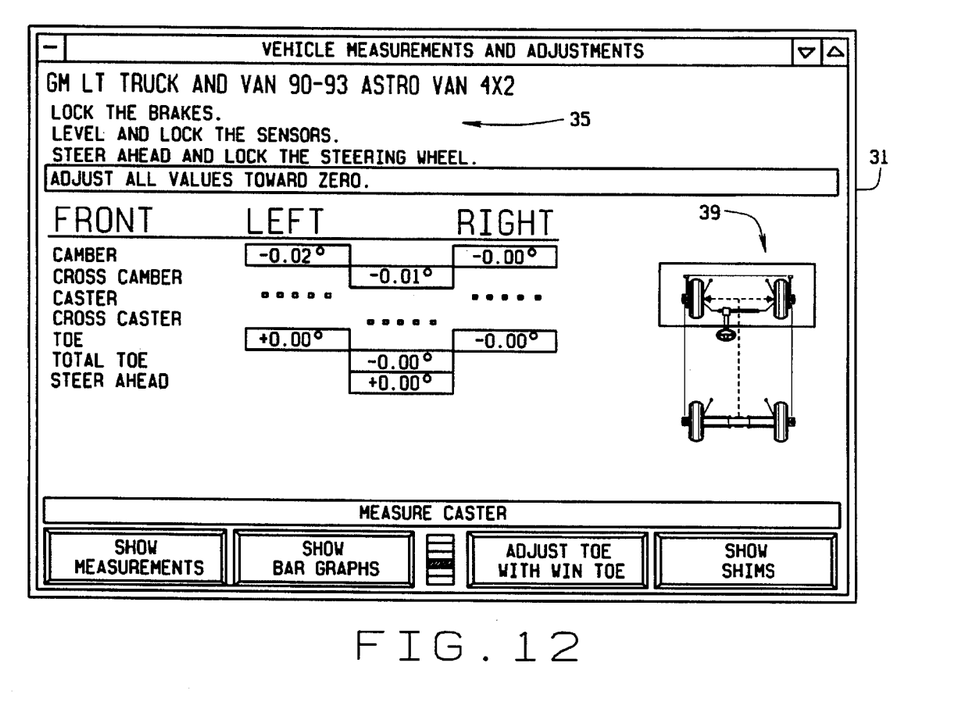

Although the present invention has been described using bar graph type indicia to guide the technician/user in making the toe adjustments, numeric indicia may be used as well. See FIGS. 10–12. In these displays, the numbers shown are "measurements minus specifications." In FIG. 10, the user begins the procedure by steering the steering wheel until it is level, then observing and remembering the numeric display for "left toe," which is a display of the measurement minus the specification for left front toe. In the second step, which is shown in FIG. 11, the user adjusts the right toe by observing the "total toe" display until this display equals the amount remembered from the previous step. After the right toe is adjusted, the user moves on to the third step, which is shown in FIG. 12, and adjusts left toe by observing the "total toe" display until it reads zero. Even if the wheels are steered and the steering wheel moves during the procedure, the adjustments are correct, because only total toe is being observed, and total toe is not sensitive to the steering of the wheel during the procedure.

In either embodiment, processor 3 continuously updates the total toe measurements and subtracts the specification for total toe to update the displays. In this context, continuously means sufficiently often that the technician/user does not unnecessarily adjust the toe past the desired target before the display is updated.

In view of the above, it will be seen that the various objects and features of the present invention are achieved, and other advantageous results obtained. The examples of the present invention described herein are illustrative only and are not to be construed in a limiting sense.

What is claimed is:

1. A method of adjusting toe of a pair of wheels on the same axle, comprising the steps of:

measuring the, toe of a first wheel of said axle;

subtracting a specification value for the toe of said first wheel from the measured value of toe for said first wheel and storing the result as a first toe comparison value;

adjusting the toe of a second wheel on said axle of said vehicle until the total toe of said wheels on said axle minus a specification value for total toe for said wheels on said axle equals the first toe, comparison value;

subsequently adjusting the toe, of the first wheel until the total toe of said wheels on said axle is substantially equal to said specification value for the total toe for said wheels on said axle.

2. The method of adjusting toe, as set forth in claim 1 wherein the total toe is substantially continuously measured as the toe adjustments are made.

3. The method of adjusting toe as set forth in claim 1 wherein the steering wheel is allowed to move during the adjustment of toe.

4. The method of adjusting toe as set forth in claim 1 wherein the specification values are prestored in an electronic memory and the measuring and subtracting steps are performed electronically.

5. The method of adjusting toe as set forth in claim 1 further including the step of guiding a technician/user to make the toe adjustments using a visual display which displays to the technician/user the direction and magnitude of the required adjustments.

6. The method of adjusting toe as set forth in claim 5 wherein the visual display is controlled to display to the technician/user a comparison of the first toe comparison value to the difference between the total toe measurement and the total toe specification value during the step of adjusting toe of the second wheel.

7. The method of adjusting toe as set forth in claim 5 wherein the visual display is controlled to display to the technician/user a comparison of the total toe measurement to the total toe specification value during the step of adjusting toe of the first wheel.

8. The method of adjusting toe as set forth in claim 5 wherein the visual display is controlled to change as the adjustment approaches completion to guide the technician/user with greater precision.

9. The method of adjusting toe as set forth in claim 5 wherein the visual display is controlled to also indicate to the technician/user the tolerance for the particular adjustment being made.

10. The method of adjusting toe as set forth in claim 1 further including the step of recording any difference between the adjusted total toe and the first comparison value when the adjustment of toe of the second wheel is completed, said difference being a toe adjustment value, further including the step of adjusting the total toe specification value used during the adjustment of the toe of the first wheel by the toe adjustment value whereby after adjustment both wheels have substantially the same toe.

11. The method of adjusting toe as set forth in claim 5 wherein the visual display includes numeric indicia representative of the magnitude of the required adjustments.

12. Vehicle wheel alignment apparatus for guiding the adjustment of toe of a pair of wheels on the same axle of a vehicle, comprising:

sensor apparatus for measuring the toe of a first wheel on a first axle of a vehicle;

sensor apparatus for measuring the toe of a second wheel on said axle;

means for storing a specification value for the toe of the first wheel;

determining means responsive to the sensor apparatus and to the storing means for subtracting the specification value from the measured value of toe for the first wheel and for storing the result in the storing means as a first toe comparison value;

said storing means having stored therein a specification value for total toe for said axle of said vehicle, the total toe being the sum of the toe for said first wheel and for the second wheel on said axle;

said determining means being responsive to the sensor apparatus for the first wheel and to the sensor apparatus for the second wheel to compute total toe and to update the computation of total toe as additional measurements of the toe of the first wheel and the second wheel are made by the sensor apparatus, said determining means being further responsive to the stored specification of total toe to compute the difference between measured total toe and the total toe specification, said difference being updated by the determining means as additional toe measurements are made by the sensor apparatus;

means responsive to the determining means for visually guiding the adjustment of the toe of the second wheel to a point where the total toe of the first and second wheels minus the total toe specification value equals the first toe comparison value, the total toe minus the total toe specification value being adjusted total toe;

said determining means being responsive to the adjusted total toe falling within a predetermined tolerance of the first toe comparison value for controlling the visually guiding means to visually guide the adjustment of the toe of the first wheel until the adjusted total toe is substantially zero.

13. The vehicle wheel alignment apparatus as set forth in claim 12 whereto the sensor apparatus substantially continuously measures toe of the respective wheels as the toe of each wheel is adjusted, the determining means being responsive to said substantially continuous measurements to update the determination of total toe substantially continuously.

14. The vehicle wheel alignment apparatus as set forth in claim 12 wherein the means for visually guiding includes a visual display, the determining means being responsive to the measurements from the sensor apparatus to control the visual display to display to a technician/user the difference between adjusted total toe and the first comparison value during adjustment of the toe of the second wheel.

15. The vehicle wheel alignment apparatus as set forth in claim 12 wherein the means for visually guiding includes a visual display, the determining means being responsive to the measurements from the sensor apparatus to control die visual display to display to a technician/user the adjusted total toe during adjustment of the first wheel.

16. The vehicle wheel alignment apparatus as set forth in claim 14 wherein the determining means is responsive to the adjusted total toe falling within a predetermined tolerance of the first comparison value to change the visual display as the adjustment approaches completion to guide the technician/user with greater precision.

17. The vehicle wheel alignment apparatus as set forth in claim 12 wherein the determining means is responsive to any difference between the adjusted total toe and the first comparison value to adjust the total toe specification by said difference during adjustment of the toe of the first wheel such that the determining means controls the visually guiding means to guide the adjustment of the toe of the first wheel taking said difference into account.

18. The vehicle wheel alignment apparatus as set forth in claim 12 wherein the visually guiding means includes a visual display having numeric indicia displayed thereon representative of the magnitude of the required adjustments.

19. The vehicle wheel alignment apparatus as set forth in claim 12 wherein the visually guiding means includes a visual display having graphical indicia displayed thereon representative of the magnitude and direction of the required adjustments.

20. The vehicle wheel alignment apparatus as set forth in claim 19 wherein the determining means is responsive to the adjustment falling within a predetermined tolerance of the desired value to control the visual display to change the graphical indicia displayed.

21. Vehicle wheel alignment apparatus as set forth in claim 19 wherein the storing means has stored therein predetermined tolerances for the adjustments, said determining means being responsive to the tolerances to vary the graphical indicia to correspond to the predetermined tolerance for the particular adjustment being displayed.

* * * * *